(12) United States Patent
Murray et al.

(10) Patent No.: US 10,106,093 B2
(45) Date of Patent: Oct. 23, 2018

(54) MOTOR VEHICLE DRAWER ASSEMBLY

(71) Applicant: Ford Global Technologies, LLC, Dearborn, MI (US)

(72) Inventors: James Nicholas Murray, Chelmsford (GB); Bruce Southey, Farnham (GB); James Neugebauer, Chelmsford (GB); Richard Craven, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/646,170

(22) Filed: Jul. 11, 2017

(65) Prior Publication Data

US 2018/0029536 A1 Feb. 1, 2018

(30) Foreign Application Priority Data

Jul. 27, 2016 (GB) .................... 1612999.1

(51) Int. Cl.
*B60R 7/08* (2006.01)
*B60R 7/02* (2006.01)
*B60R 7/04* (2006.01)
*B60R 11/00* (2006.01)

(52) U.S. Cl.
CPC .................. *B60R 7/08* (2013.01); *B60R 7/02* (2013.01); *B60R 7/04* (2013.01); *B60R 2011/0042* (2013.01); *B60R 2011/0084* (2013.01)

(58) Field of Classification Search
CPC ..... B60R 7/08; B60R 7/02; B60R 2011/0042; B60R 2011/0084

USPC ...... 312/330.1, 291, 137, 404, 270.1, 270.3, 312/301; 108/44; 220/521, 522; 296/37.8

See application file for complete search history.

(56) References Cited

U.S. PATENT DOCUMENTS

| | | | | |
|---|---|---|---|---|
| 740,677 | A | * | 10/1903 | Monsen et al. |
| 3,266,858 | A | * | 8/1966 | Klotz .................... F25D 25/021 312/270.3 |
| 3,874,552 | A | * | 4/1975 | Grimm .................. B65D 43/12 312/270.3 |
| 4,126,224 | A | * | 11/1978 | Laauwe .................. B65D 43/20 206/1.5 |

(Continued)

FOREIGN PATENT DOCUMENTS

| | | |
|---|---|---|
| DE | 3524222 A1 | 1/1987 |
| DE | 4122472 A1 | 1/1993 |

(Continued)

*Primary Examiner* — Janet M Wilkens
(74) *Attorney, Agent, or Firm* — Vichit Chea; Price Heneveld LLP

(57) ABSTRACT

A motor vehicle drawer assembly is disclosed having a slideable drawer and a moveable plate housed in a casing. The drawer and the plate both have overlying compressible members used to restrain from movement an item placed in the drawer when the drawer is in a closed position. Movement of the drawer to the closed position causes the plate to move towards the drawer to clamp any item resting on the drawer thereby restraining movement of the item but not until the drawer approaches the closed position. The use of a clamping mechanism that only allows for movement of the plate towards the drawer when the drawer approaches the closed position prevents the plate from interfering with stowing of the item.

20 Claims, 5 Drawing Sheets

(56) References Cited

U.S. PATENT DOCUMENTS

| | | | | |
|---|---|---|---|---|
| 5,251,975 A * | 10/1993 | Braun | B65F 1/1436 | 312/334.16 |
| 5,299,722 A * | 4/1994 | Cheney | B60R 7/14 | 206/317 |
| 7,363,773 B2 * | 4/2008 | Lee | F25D 17/045 | 62/408 |
| 7,533,918 B2 * | 5/2009 | Spykerman | B60N 2/793 | 296/24.34 |
| 8,474,897 B1 * | 7/2013 | Jackson | B60R 7/04 | 296/24.34 |
| 9,788,652 B2 * | 10/2017 | Greer | A47B 31/00 | |
| 2003/0090116 A1 | 5/2003 | Radstake | | |
| 2010/0078954 A1 * | 4/2010 | Liu | B60N 3/101 | 296/24.34 |
| 2011/0089072 A1 * | 4/2011 | Gillam | B65D 81/113 | 206/523 |
| 2012/0024729 A1 * | 2/2012 | Dietenberger | A63F 9/1044 | 206/315.1 |
| 2013/0161224 A1 * | 6/2013 | Lee | A47J 47/04 | 206/526 |
| 2013/0300276 A1 * | 11/2013 | Nuss | F25D 25/021 | 312/404 |
| 2015/0102717 A1 * | 4/2015 | Furr | F25D 25/025 | 312/404 |
| 2015/0253065 A1 * | 9/2015 | Min | B65D 25/22 | 312/404 |

FOREIGN PATENT DOCUMENTS

| | | |
|---|---|---|
| DE | 202004019486 U1 | 4/2006 |
| DE | 102004062767 B3 | 5/2006 |
| DE | 102009044540 B3 | 12/2010 |
| JP | 2007331693 A | 12/2007 |

\* cited by examiner

MOTOR VEHICLE DRAWER ASSEMBLY

FIELD OF THE INVENTION

The present invention generally relates to motor vehicles, and in particular to a motor vehicle drawer assembly for transporting small items.

BACKGROUND OF THE INVENTION

It is generally well-known to provide a motor vehicle with storage means such as a glove box, a storage bin or an under seat drawer for transporting small items. It can be a problem with such known devices that items placed in such storage devices are able to move freely within the storage device and so are prone to rattling. Such rattling can be annoying to a user of the motor vehicle and if the item being transported is delicate such as sunglasses or a mobile phone can result in minor damage such as scratching or abrasions occurring to the transported item.

It would be desirable to provide a motor vehicle drawer assembly that overcomes the aforementioned problems.

SUMMARY OF THE INVENTION

According to a first aspect of the invention, there is provided a motor vehicle drawer assembly comprising a drawer slidingly supported for sliding movement by a support structure between a closed position and an open position, a plate moveably supported by the support structure for movement between a raised position in which the plate is spaced away from the drawer and a lowered position in which the plate is positioned substantially parallel and in close proximity to the drawer and a clamping mechanism to move the plate in response to movement of the drawer wherein at least one of the plate and the drawer includes a compressible member that is deformed by an item placed in the drawer when the drawer is in the closed position and the plate is in the lowered position so as to prevent movement of the item and the clamping mechanism only moves the plate when the drawer is close to the closed position.

The drawer may be close to the closed position when it is within a predefined distance from the closed position. The plate and the drawer may both have a compressible member and both of the compressible members may be deformed by an item placed in the drawer when the drawer is in the closed position and the plate is in the lowered position. Each compressible member may have a non-planar surface for contact with the item. Each compressible member may be a foam pad.

The clamping mechanism may move the plate from the raised position towards the lowered position when the drawer is close to the closed position and the drawer is being closed. The plate may be moveably supported by the support structure to maintain it substantially parallel to the drawer at all times. The plate may be biased into the raised position by at least one spring biasing device and moved to the lowered position against the action of the spring biasing means by the clamping mechanism.

The clamping mechanism may comprise a lever pivotally supported by the support structure drivingly connected to the plate and a complementary driving surface on the drawer for engagement with the lever. The support structure may be a casing used to support the plate and the drawer.

According to a second aspect of the invention there is provided a motor vehicle drawer assembly. The motor vehicle drawer assembly includes a drawer slideable between closed and open positions, and a plate moveable between a raised position spaced from the drawer and a lowered position positioned in close proximity to the drawer. The assembly also includes a clamping mechanism to move the plate responsive to movement of the drawer, wherein a compressible member compresses on an item in the drawer in the closed position with the plate in the lowered position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1A:
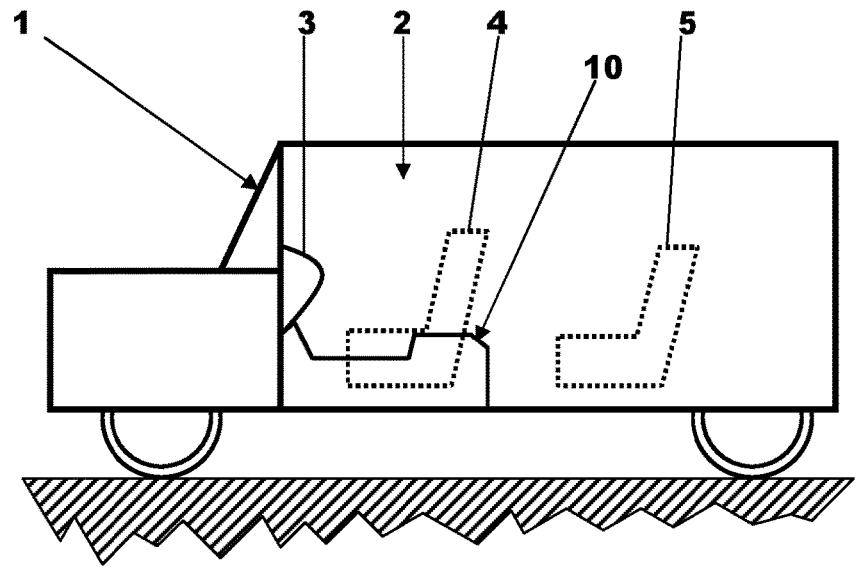
FIG. 1a is a diagrammatic side view of a motor vehicle having a center console supporting a drawer assembly in accordance with one embodiment.
Figure 1B:
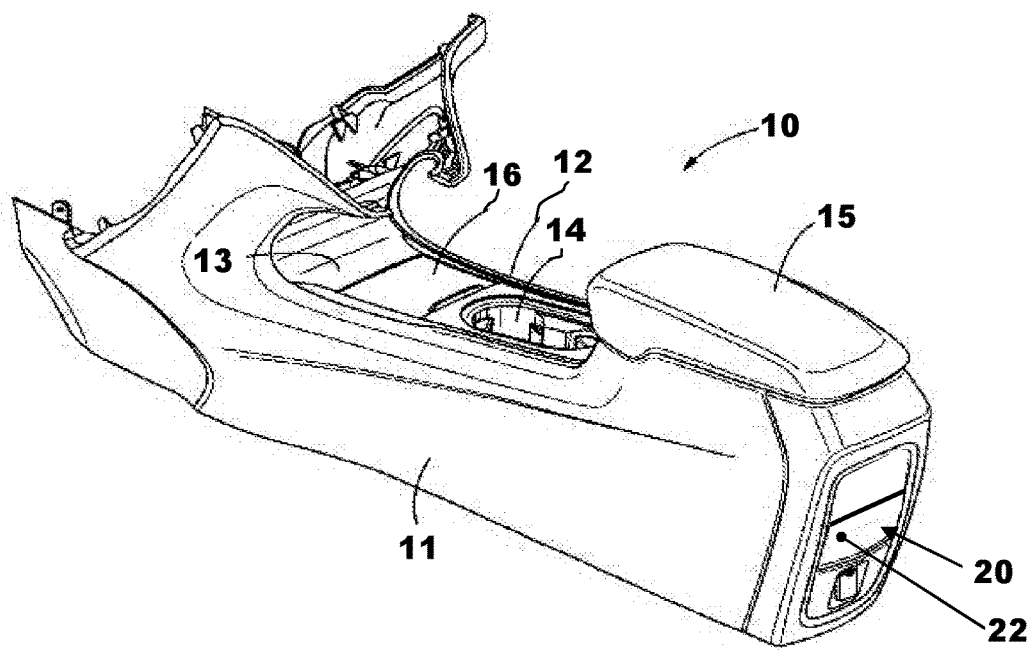
FIG. 1b is a rear three quarter pictorial view of the center console shown in FIG. 1 showing the location of the drawer assembly.
Figure 2:
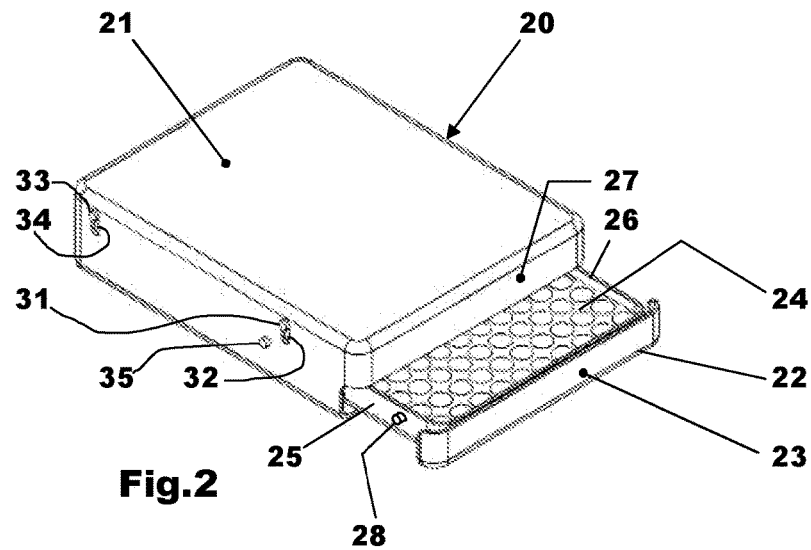
FIG. 2 is a front three quarter pictorial view of the drawer assembly shown in FIG. 1b prior to assembly of the drawer assembly to the center console and showing a drawer in a partially open position.
Figure 3A:
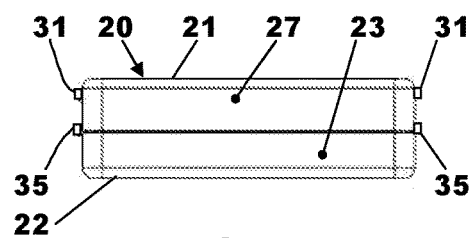
FIG. 3a is a front view of the drawer assembly shown in FIG. 2.
Figure 3B:
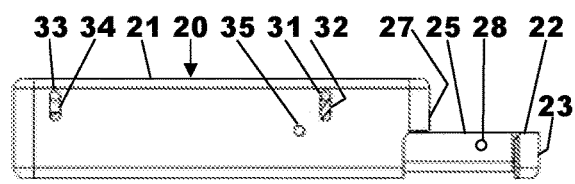
FIG. 3b is a left hand side view of the drawer assembly shown in FIG. 2.
Figure 3C:
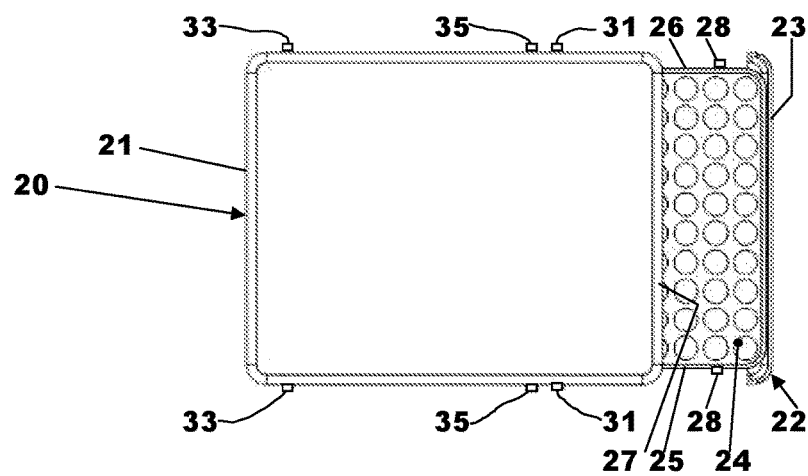
FIG. 3c is a top plan view of the drawer assembly shown in FIG. 2.

Referring now to FIGS. 1a and 1b there is shown a motor vehicle 1 defining a passenger compartment 2 in which is mounted an instrument panel 3, first and second rows of seats 4 and 5 and a center floor console 10 that extends rearwardly away from the instrument panel 3 so as to be positioned between a pair of seats forming the first row of seats 4.

The center floor console 10 includes a housing that is defined by a pair of side panels 11 and 12 and an upper panel 13 that generally extends between the pair of side panels 11 and 12. A drawer assembly 20 constructed according to one embodiment is mounted in the center console 10 so as to be accessible to a passenger seated on one of the seats forming the second row of seats 5. The center console 10 also includes a cup holder 14 and an armrest 15, both of which may be conventional in construction, and the center console 10 may be shaped having an interior space that may define a conventional storage bin covered by a cover 16.

Referring now to FIGS. 2-6, the motor vehicle drawer assembly 20 comprises a structural support in the form of a casing 21 arranged to slidingly support a drawer 22 and moveably support a plate 40. The plate 40 may also be referred to as a platen and is movable between a raised position and a lowered position which operates as a press or a platen when an item is contacted. The casing 21 has a front wall 27 including an aperture through which the drawer 22 slides when moving between respective open and closed positions. It will be appreciated that the casing 21 is constructed to enable the components of the drawer assembly 20 to be assembled.

Figure 6:
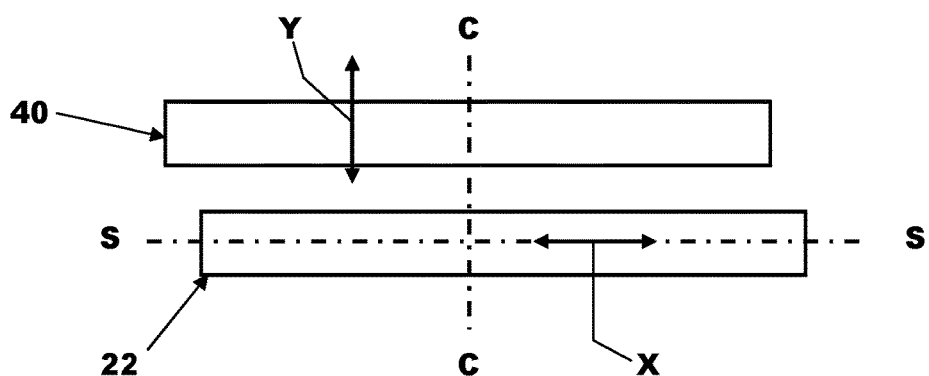
FIG. 6 is a diagrammatic representation showing the principle of operation of the drawer assembly shown in FIGS. 1b-5.
Figure 5:
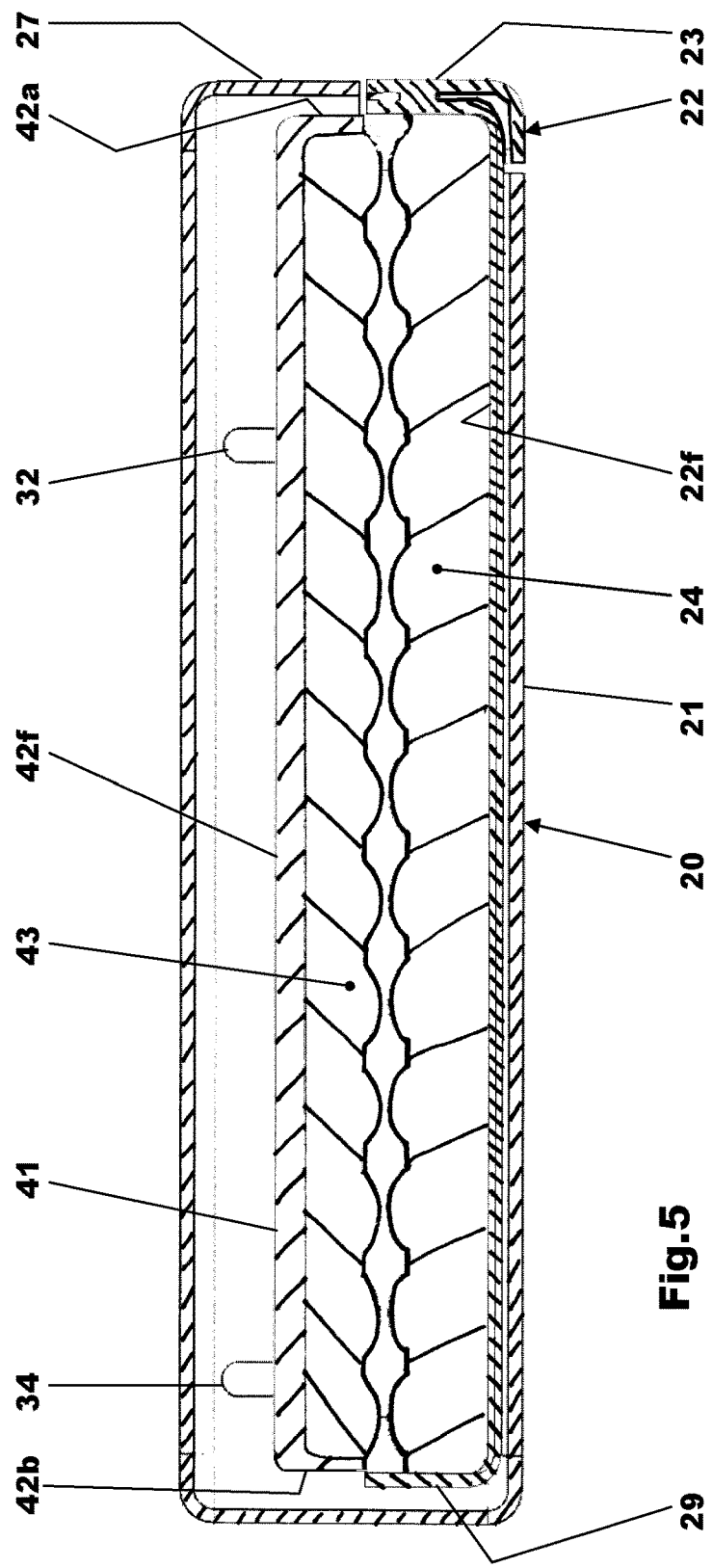
FIG. 5 is a longitudinal cross section through the drawer assembly of FIG. 2 when the drawer is in the closed position.

As shown in FIG. 6, the drawer 22 in the case of this example is slideably along a first axis S-S between respective closed and open positions as indicated by the double headed arrow X and the plate 40 is moveable along a second axis C-C arranged orthogonally with respect to the first axis S-S between raised and lowered positions as indicated by the double headed arrow Y. When the drawer 22 is in the closed position the plate 40 is in the lowered position and when the drawer 22 is in the open position the plate 40 is in the raised position.

The movement of the plate 40 is controlled so that the plate 40 and the drawer 22 remain substantially parallel to one another irrespective of their respective positions. To achieve this, guide pins 33 are engaged with elongate slots 34 in side walls of the casing 21 towards a rear end of the casing 21 and driven pins 31 are engaged with elongate slots 32 in the side walls of the casing towards the front wall 27 of the casing 21. The driven pins 31 have two roles, firstly they guide the motion of the plate 40 so that it remains substantially parallel to the drawer 22 at all times and secondly they form part of an actuation mechanism described in further detail hereinafter. The orientation of the elongate slots 32, 34 is such that respective longitudinal axes of the slots 32, 34 are aligned parallel to one another and to the axis C-C.

However it will be appreciated that the elongate slots 32, 34 could be inclined so as to move the plate 40 away from the front wall 23 of the casing 21 as it moves towards the drawer 22 or could be curvilinear to produce motion of the plate 40 away from the front wall 27 as the plate 40 moves towards the drawer 22. Both of these arrangements has the advantage that the plate 40 will be moving in the same lateral direction as the drawer 22, thereby reducing or preferably eliminating relative movement between the plate 40 an the item being clamped or held by the drawer assembly 20.

It will be further appreciated that other means could be used to guide the movement of the plate 40 and that the drawer assembly is not limited to the use of pins and slots. For example and without limitation, the plate 40 could have a number of ribs along each side for engagement with complementary grooves formed in the casing 21 or vice-versa.

The drawer 22 is, in the case of this example, in the form of a shallow tray supporting a sheet of foam in the form of a foam pad 24. The shallow tray comprises a pair of side walls 25, 26 extending between a drawer front 23 and a rear wall 29 and a substantially flat floor 22f for supporting the foam pad 24. The shallow tray of the drawer 22 may be molded as a single component from a rigid plastics material.

The plate 40 is in the case of this example in the form of a shallow tray supporting a sheet of foam in the form of a foam pad 43. The shallow tray comprises a pair of side walls 41 extending between a front wall 42a and a rear wall 42b and a substantially flat base 42f for supporting the foam pad 43. The shallow tray of the plate 40 is molded as a single component from a rigid plastics material. Note that, in the case of this example, the width and length dimensions of the shallow tray of the plate 40 are slightly smaller than the corresponding width and length dimensions of the shallow tray of the drawer 22 and that because the plate 40 is housed within the casing 21 with clearance, the length and width dimensions of the plate 40 must also be less than corresponding internal dimensions of the casing 21.

When the plate 40 is moved to the lowered position, the foam pad 43 in this case just makes contact with the foam pad 24 supported by the drawer 22. Movement of the plate 40 to the lowered position forms a press that operates as a platen to contact one or more items in the drawer 22. However, it will be appreciated that there could be a small gap between the foam pads 43 and 24 in other embodiments.

When an item is placed on top of the foam pad 24 of the drawer 22 and the drawer 22 is closed, in the disclosed embodiment, both foam pads 24, 43 will be compressed because the plate 40 is lowered. It is the compression of the two foam pads 24, 43 that holds an item located in the drawer 22 in position and not direct clamping by the plate 40.

It will be appreciated that there need only be one foam pad and that the foam pad or pads could be replaced by another compressible material. However, it is preferable if two foam pads are used and also desirable for the surfaces of the pads to be non-planar so that load is built up gradually as the plate 40 approaches the drawer 22. The foam pads 24, 43 are preferably of an egg crate pattern as shown or are made from a material such as convoluted foam sheet.

A clamping mechanism is provided to move the plate 40 towards the drawer 22. The clamping mechanism comprises, in the case of this example, a pair of actuation levers 36 pivotally supported by the casing 21, the pair of driven pins 31 extending outwardly from the side walls 41 of the plate 40 and complementary driving surfaces on the drawer 22 for engagement with the levers 36 in the form of a pair of driving pins 28 extending outwardly from the side walls 25, 26 of the drawer 22.

Each actuation lever 36 is pivotally supported by a pivot pin 35 engaged with an aperture formed in the casing 21 and has an elongate slot 38 formed near to one end with which a respective driven pin 31 is engaged. Rotation of the actuation lever 36 shown in FIGS. 4a to 4e in a clockwise direction will cause the plate 40 to move towards the drawer 22 and vice-versa. It will be appreciated that a spring biasing device, e.g., one or more springs, (not shown) may be provided to bias the plate 40 away from the drawer 22. The biasing device could be arranged to act directly on the shallow tray of the plate 40 or could be arranged to act on one or both of the actuation levers 36.

The plate 40 is biased into the raised position by the at least one spring biasing device and is moved towards the lowered position against the action of the spring biasing device by the clamping mechanism.

One of the key features of the drawer assembly 20 is that the clamping mechanism may be constructed so that movement of the plate 40 towards the drawer 22, that is to say in a lowering direction, does not commence until the drawer 22 has almost reached the fully closed position that is to say is within a predefined distance from the closed position. This feature may be important because, if the plate 40 were to be lowered too early during closing of the drawer 22, there is a risk that an item resting on the foam pad 24 of the drawer 22 would be blocked from entering the casing 21 by a lowered or partially lowered plate 40. It will be appreciated that when placed on the foam pad 24, the item to be stored must not project above the drawer front 23 or side walls 25, 26 of the shallow tray otherwise it cannot enter through the aperture formed in the front wall 27 of the casing 21.

In order to produce this late activation of the activation mechanism, the distance "d" of each of the driving pins 28 from the outer face of the drawer front 23 (see FIG. 4a) in the case of this example is slightly greater than the distance "f" (shown on FIG. 4c) of an abutment surface on the respective actuation lever 36 from an outer surface of the front wall 27 of the casing 21 when the driving pins first make contact with the actuation levers 36. The abutment surface on each actuation lever 36 is a surface against which the driving pin 28 reacts during lowering of the plate 40 from an outer surface of the front wall 27 of the casing 21.

It will be appreciated that the positioning of the driving pins 28 is based upon the location of the lever 36 and so if, for example, the levers 36 co-operated with the pins 33 instead of the pins 31 then the driving pins 28 would need to be positioned closer to the rear wall 29 of the shallow tray of the drawer 22. It will also be appreciated that the rear wall 29 of the shallow tray of the drawer 22 could itself react directly against one or more levers. It will be further appreciated that the drawer assembly 20 is not limited to this clamping mechanism and that other mechanisms such as cam drives, gear drives, cable drives could be used to provide a similar functionality.

With particular reference to FIGS. 4a-4e, operation of the drawer assembly 20 will now be described in greater detail.

Figure 4A:
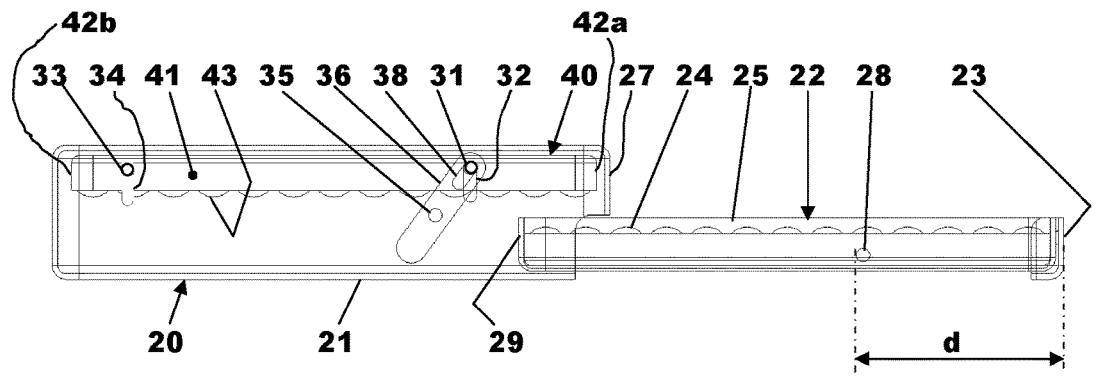
FIG. 4a is a ghosted side view of the drawer assembly shown in FIG. 2 showing operational positions of a clamping mechanism of the drawer assembly with the drawer in a fully open position.

In FIG. 4a the drawer 22 is in the fully open position so that it projects outwardly away from the front wall 27 of the casing 21. In this position it is easy for a user to place an item onto the foam pad 24 of the drawer 22 ready for storage.

Figure 4B:
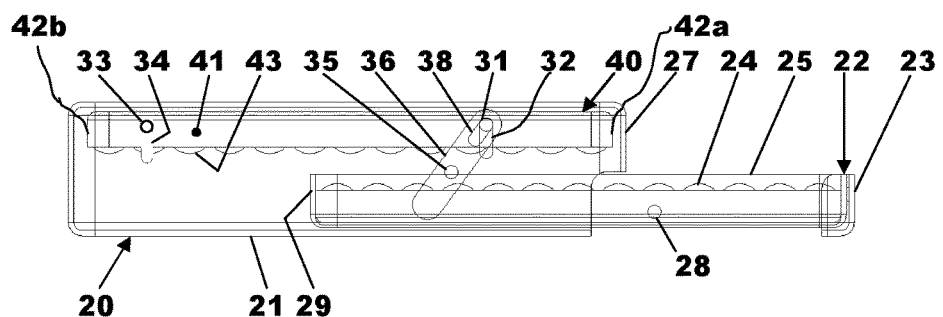
FIG. 4b is a ghosted side view of the drawer assembly shown in FIG. 2 showing operational positions of a clamping mechanism of the drawer assembly with the drawer in a half open position.

In FIG. 4b the drawer 22 has been pushed towards the end wall 27 of the casing 21 by a user causing the drawer 22 to slide through the aperture in the front wall 27 of the casing 21 into a partially closed position. In this position there has been no contact between the driving pins 28 and the actuation levers 36 and so the plate 40 remains in a fully raised position.

Figure 4C:
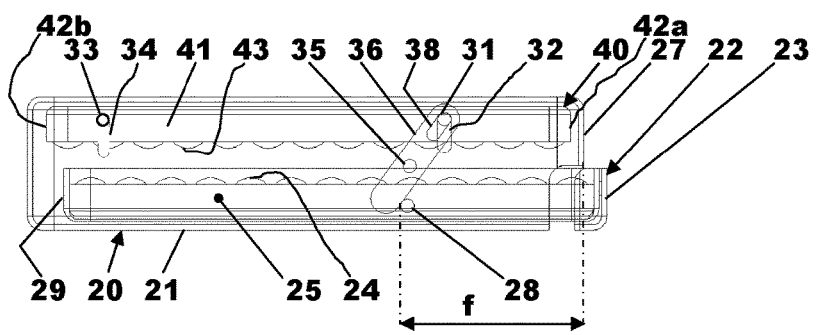
FIG. 4c is a ghosted side view of the drawer assembly shown in FIG. 2 showing operational positions of a clamping mechanism of the drawer assembly with the drawer in a partial open position.

In FIG. 4c the drawer 22 has been slid into the casing 21 so that it is close to and approaches the closed position but still projects by a small amount from the front wall 27 of the casing 21. The drawer 22 in this position has approached the fully closed position but is not fully closed and is said to be a predefined distance from the closed position. In this position the driving pins 28 have just come into contact with the abutment surfaces on the actuation levers 36 but no rotation of the actuation levers 36 has occurred about the pivot pins 35.

Figure 4D:
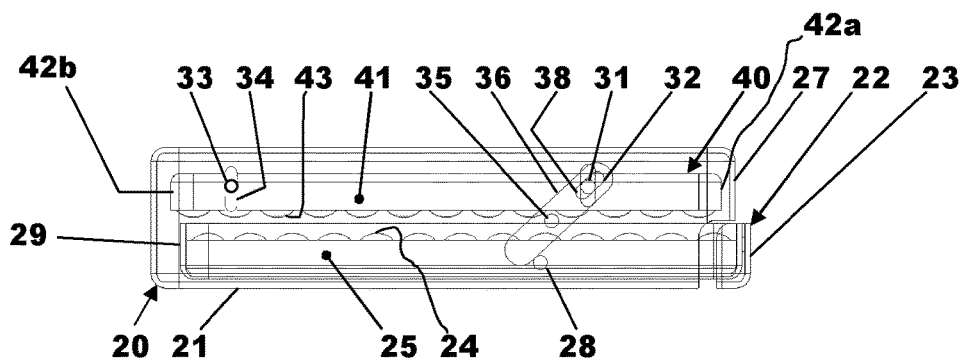
FIG. 4d is a ghosted side view of the drawer assembly shown in FIG. 2 showing operational positions of a clamping mechanism of the drawer assembly with the drawer in a nearly closed position.

In FIG. 4d the closing motion of the drawer 22 from the position shown in FIG. 4c has continued as the drawer 22 is pushed by a user into the casing 21 and the drawer 22 is now less than the predefined distance from the closed position. The sliding of the drawer 22 further into the casing 21 causes the actuation levers 36 to be rotated in a clockwise direction about the pivot pins 35, resulting in the driving pins 31 being displaced in the elongate slots 32, 38 and causing the plate 40 to move towards the drawer 22. That is to say the plate 40 is moved in a clamping direction so as to be lowered from is fully raised position.

Figure 4E:
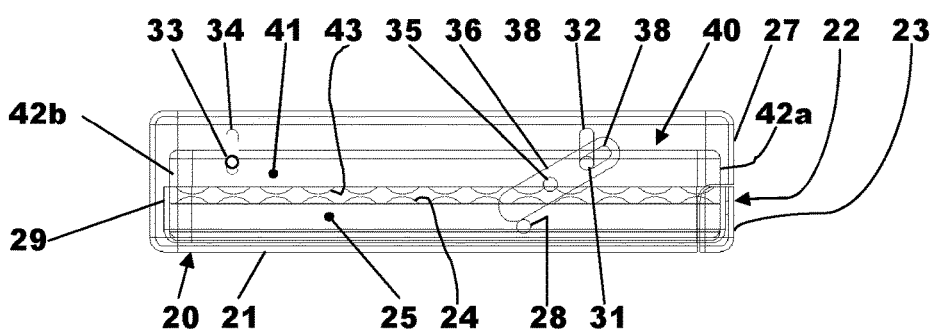
FIG. 4e is a ghosted side view of the drawer assembly shown in FIG. 2 showing operational positions of a clamping mechanism of the drawer assembly with the drawer in a fully closed position.

As the drawer 22 is further slid into the casing 21 the plate 40 will continue to move in a clamping direction and this motion will cause the foam pad 43 of the plate 40 to contact the item being stored. Further lowering of the plate 40 as the drawer 22 is moved towards the closed position will cause the foam pads 24, 43 to be further compressed as the plate 40 moves towards the drawer 22 until eventually, as shown in FIG. 4e the drawer 22 is in the closed position. In the closed position the outer surfaces of the end wall 27 of the casing 21 and the drawer front 23 are in the case of this embodiment substantially aligned.

It will be appreciated that in practice a push-push latch or other type of latch mechanism may be provided to retain the drawer 22 in the fully closed position. Such latch mechanisms are well known and so no latch mechanism is shown in the figures to ease understanding of the drawer assembly.

When the drawer 22 is released from the fully closed position, the steps referred to with respect to FIGS. 4a-4e occur in the reverse order so that initially the actuation levers 36 will rotate in an anticlockwise direction about their respective pivot pins 35 until the plate 40 has returned to its fully up position at which point the driving pins 28 lose contact with the actuating levers 36 and the drawer 22 will then move to its fully open position without causing any further movement of the plate 40.

It will be appreciated that the shallow trays of the drawer 22 and the plate 40 do not directly clamp any item placed in the drawer 22. The holding force is provided by the compression of the two foam pads 24, 43. This has the advantage that items of differing thickness can readily be accommodated by a drawer assembly 20 constructed in this manner.

It will be appreciated that more than one item can be stored in the drawer assembly 20 at the same time and that in such a case the holding force applied to each item will be different if the items are not of the same thickness.

One particularly advantageous use for the drawer assembly is for storing a mobile telephone, this is particularly the case if the drawer assembly includes non-contact charging means to recharge the mobile telephone. In such an embodiment the plate or the drawer would include an inductive charging coil that forms a charging circuit with a coil located within the mobile telephone when the mobile telephone is placed in close proximity to the charging coil and the charging coil is energized. It will be appreciated that in order for effective charging to take place, the mobile telephone needs to be maintained in close proximity to the charging coil during charging and that a drawer assembly constructed in accordance with this embodiment is able to provide the positional stability required for charging.

Although in the case of the example shown, the structural support for the drawer and plate is provided by a casing so that the drawer assembly is in the form of a self-contained cassette unit that can be conveniently fitted to many parts of a motor vehicle interior such as, for example and without limitation, an instrument panel, a center console, a door casing or under a seat. However, it will be appreciated by those skilled in the art that the structural support could be formed as part of the component to which the drawer is fitted.

It will be appreciated that the drawer assembly shown and described herein is provided by way of example and that the invention is not limited to a drawer assembly of the relative dimensions and specific construction disclosed and that alternative embodiments could be constructed without departing from the scope of the invention as defined by the appended claims.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A motor vehicle drawer assembly comprising:
a drawer slidingly supported for sliding movement by a support structure between a closed position and an open position;
a plate moveably supported by the support structure for movement between a raised position in which the plate is spaced away from the drawer and a lowered position in which the plate is positioned substantially parallel and in close proximity to the drawer, wherein the direction of the movement of the plate between the raised position and the lowered position is substantially orthogonal to the direction of the siding movement of the drawer between the closed position and the open position; and
a clamping mechanism to move the plate in response to movement of the drawer, wherein at least one of the plate and the drawer includes a compressible member that is deformed by an item placed in the drawer when the drawer is in the closed position and the plate is in the lowered position so as to prevent movement of the item, and the clamping mechanism only moves the plate when the drawer is close to the closed position.

2. The assembly as claimed in claim 1, wherein the drawer is close to the closed position when it is within a predefined distance from the closed position.

3. The assembly as claimed in claim 1, wherein the plate and the drawer both have a compressible member and both of the compressible members are deformed by an item placed in the drawer when the drawer is in the closed position and the plate is in the lowered position.

4. The assembly as claimed in claim 1, wherein each compressible member has a non-planar surface for contact with the item.

5. The assembly as claimed in claim 1, wherein each compressible member is a foam pad.

6. The assembly as claimed in claim 1, wherein the clamping mechanism moves the plate from the raised position towards the lowered position when the drawer is close to the closed position and the drawer is being closed.

7. The assembly as claimed in claim 1, wherein the plate is moveably supported by the support structure to maintain the plate substantially parallel to the drawer at all times.

8. The assembly as claimed in claim 1, wherein the plate is biased into the raised position by at least one spring biasing device and moved to the lowered position against the action of the spring biasing device by the clamping mechanism.

9. The assembly as claimed in claim 1, wherein the clamping mechanism comprises,
a lever pivotally supported by the support structure and drivingly connected to the plate; and
a complementary driving surface on the drawer for engagement with the lever.

10. The assembly as claimed in claim 1, wherein the support structure comprises a casing used to support the plate and the drawer.

11. A motor vehicle drawer assembly comprising:
a drawer slideable between closed and open positions;
a plate moveable between a raised position spaced from the drawer and a lowered position positioned in close proximity to the drawer; and
a clamping mechanism, comprising a lever, to move the plate responsive to movement of the drawer, wherein a compressible member compresses on an item in the drawer in the closed position with the plate in the lowered position.

12. The assembly as claimed in claim 11, wherein the clamping mechanism only moves the plate when the drawer is close to the closed position, wherein the drawer is close to the closed position when it is within a predefined distance from the closed position.

13. The assembly as claimed in claim 11, wherein at least one of the plate and the drawer have a compressible member and the compressible member is deformed by an item placed in the drawer when the drawer is in the closed position and the plate is in the lowered position.

14. The assembly as claimed in claim 11, wherein the compressible member has a non-planar surface for contact with the item.

15. The assembly as claimed in claim 11, wherein the compressible member is a foam pad.

16. The assembly as claimed in claim 11, wherein the clamping mechanism moves the plate from the raised position towards the lowered position when the drawer is close to the closed position and the drawer is being closed.

17. The assembly as claimed in claim 11, wherein the drawer and plate are supported by a support structure and the plate is moveably supported by the support structure to maintain the plate substantially parallel to the drawer at all times.

18. The assembly as claimed in claim 11, wherein the plate is biased into the raised position by at least one spring biasing device and moved to the lowered position against the action of the spring biasing device by the clamping mechanism.

19. The assembly as claimed in claim 11, wherein the clamping mechanism comprises,
the lever pivotally supported by a support structure and drivingly connected to the plate; and
a complementary driving surface on the drawer for engagement with the lever.

20. The assembly as claimed in claim 19, wherein the support structure comprises a casing used to support the plate and the drawer.

* * * * *